Patented June 14, 1938

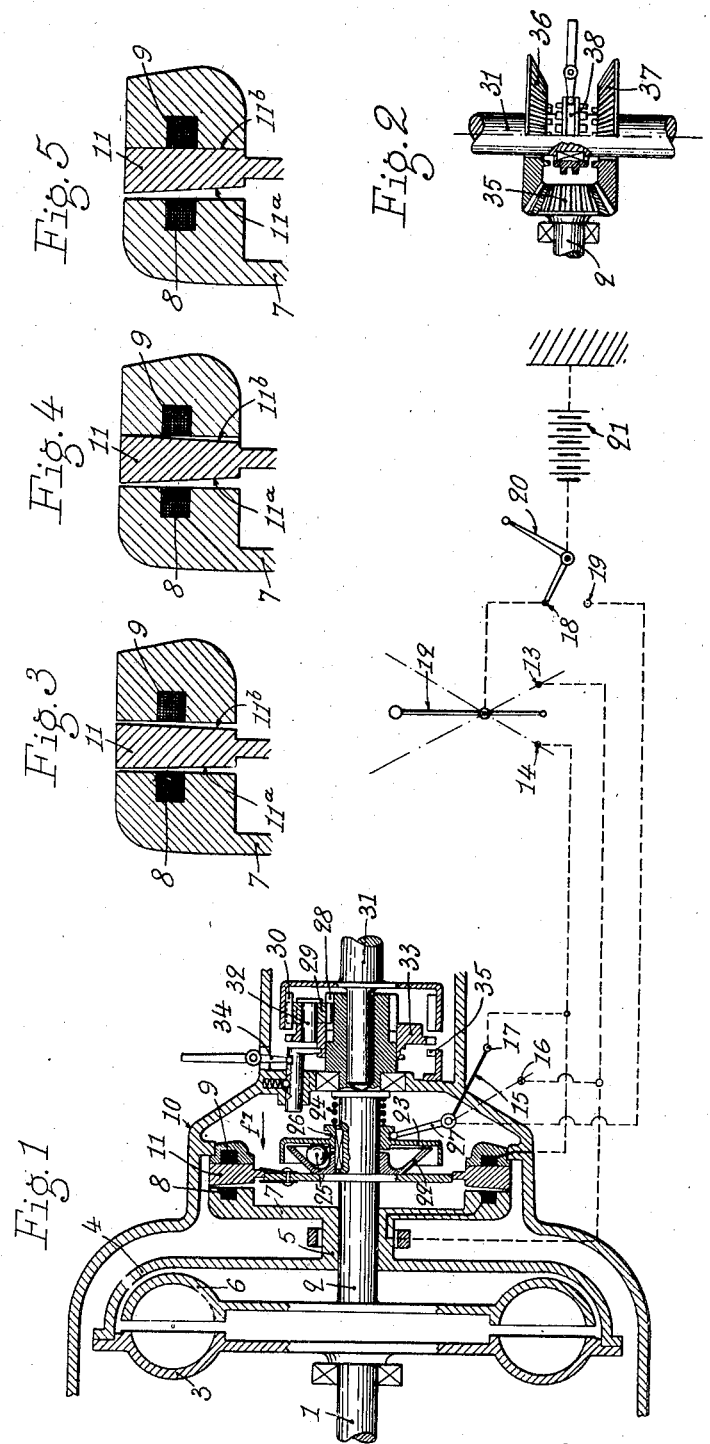

2,120,734

UNITED STATES PATENT OFFICE 2,120,734

COUPLING MECHANISM

Jean Cotal, Paris, France

Application March 8, 1937, Serial No. 129,755
In France March 11, 1936

9 Claims. (Cl. 192—12)

Certain devices for coupling a driving shaft to a driven shaft, and chiefly those in which slipping is allowed between said shafts, such as hydraulic coupling devices, are usually attended with the drawback consisting in the fact that they maintain a driving torque which is quite apparent even at the slowest speeds. This feature is most prejudicial when such coupling devices are followed by a speed changing or a reversing gear, whose operation requires the engagement of teeth or of claws. Owing to the friction produced by this driving, it is sometimes impossible and often very difficult, to change the speed, as shocks always take place at the time when the parts are engaging each other.

On the other hand with said coupling devices, slipping occurs at normal speeds, i. e., the driven shaft, owing to its resistance, will rotate at a slower speed than the driving shaft. This slipping, which is the more apparent according as the speed of rotation is lower, permits, to a certain degree, of utilizing the said devices as clutches or even torque converters. But as a rule, such slipping still remains after the whole clutching action has been finished.

A certain part of the driving power is thus taken up in a continuous manner, thus causing a heating action to a degree which sometimes is detrimental.

The present invention relates to a coupling device of the hydraulic or other type, which is improved for the purpose of eliminating the said drawbacks.

The said device is chiefly characterized by the fact that it comprises an electro-magnetic brake which serves to brake or to stop the driven shaft or part. According to another characteristic, there is provided in combination with said electromagnetic brake an electro-magnetic clutch which serves for a direct drive between the driven shaft and the driving shaft, thus dispensing with all effects of slipping.

The said electro-magnetic device or devices are preferably combined with a controlling device which ensures the energizing of the electromagnets, and which permits, at will, either to render the operation of these devices automatic, or on the contrary to subject them to an action which is under the control of the driver.

The invention has further for its object an electro-magnetic device which can be utilized as a clutch device or as a brake, and chiefly in the aforesaid coupling mechanism. This electromagnetic device is characterized by the fact that it comprises an armature whose contact and friction surface or surfaces are very slightly tapered and concave.

In consequence, this surface, or each of its tapered surfaces, will make contact with the corresponding surface, in the first place at the periphery, the contact upon the entire surface taking place by reason of the elastic deformation of the armature. This increases the capacity of adhesion between the two surfaces which are brought into contact and the gradual nature of the movement by which they come together.

Further characteristics will be set forth in the following description.

In the accompanying drawing, which is given solely by way of example.

Fig. 1 is a vertical section of a hydraulic coupling mechanism, which is improved according to the invention.

Fig. 2 represents a reversing gear, which may be placed after said hydraulic coupling mechanism.

Fig. 3 is a radial section, in the idle position, of the electro-magnetic device with an armature having tapered contact surfaces.

Figs. 4 and 5 are analogous sections of this device, respectively at the beginning of the elastic deformation and after the complete deformation of the said armature.

In the embodiment shown in Fig. 1, the driving shaft 1 is connected with the driving shaft 2 by a hydraulic coupling device. For this purpose, to the shaft 1 is keyed a member 3 to which is secured at the periphery a member 4 provided with a sleeve 5 which is concentric with the driven shaft 2. The said shaft 2 carries the inner member 6 of the hydraulic coupling device.

The sleeve 5, which participates in the rotation of the driving shaft 1, carries a disc 7 on which is mounted an electro-magnet 8 which thus rotates together with said driving shaft 1. Opposite said electro-magnet 8 and at a certain distance from the latter, is mounted a second electro-magnet 9 which is secured to the stationary casing 10.

Between the electro-magnets 8 and 9 is located an armature 11 which rotates together with the driven shaft 2 of the hydraulic coupling device, and said armature can be attracted by the rotating electro-magnet 8 or by the stationary electro-magnet 9. According as one or the other of these electro-magnets is excited, said armature may rotate with more or less friction against the electro-magnets, or may turn freely between them.

The exciting current for the electro-magnets is controlled either by a hand-operated switch 12 whose contact-piece 13 is connected with the rotating electro-magnet 8, and whose contact-piece 14 is connected with the stationary electro-magnet 9, or by a switch 15 under automatic control, whose contact piece 16 is connected with the rotating electro-magnet 8, the contact-piece 17 being connected with the stationary electro-magnet 9.

The contact-pieces 18 and 19 of another switch 20 are respectively connected with the hand-operated switch 12 and with the automatic switch 15.

In this manner, one or the other of the two first-mentioned switches can be connected with a source of current 21, or all supply of current can be cut off.

The operation of the automatic switch 15 will depend upon the speed of the driven shaft 2. This latter actuates, for instance, a centrifugal device which consists chiefly of two sleeves provided with discs. The sleeve 22 is secured to the shaft 2 and the sleeve 23 participates in the rotation of the shaft 2 but is movable lengthwise in the direction of the arrow $f^1$ under the action of a spring 24, and in the opposite direction by the thrust of the heavy masses 25 which, above a certain speed, are subjected to centrifugal forces whose action upon the disc 23 exceeds the action of the spring 24.

In the said disc 23 is an annular groove 26 in which is engaged a member 27 secured to the arm 15 of the switch, which thus participates in the longitudinal movements of the disc 23.

The driven shaft 2 is connected with the wheels or other parts to be actuated, by means of a change speed gear and/or a reversing gear. The rear end of the shaft 2 carries, for example, a set of teeth 28 forming a sun-wheel, in engagement with planetary pinions 29, which latter are engaged with an internal tooth wheel 30 forming the second sun-wheel and participating in the rotation of the driven shaft 31.

The shafts 32 of the planetary pinions 29 are mounted on a disc forming a toothed ring which can be engaged by a fork 34 with a stationary toothed ring or a sector 35 or with the ring 30. When the ring 33 is engaged with the stationary ring 35, this will cause a reduction of speed between the shafts 2 and 31, with a change in the direction of drive; on the contrary, when the rings 33 and 30 are in engagement, there will be a direct drive between the shafts 2 and 31.

The operation is as follows, in the case of manual control. By the contact-piece 18 which is supposed to be connected with the source of current 21, the current enters the hand-switch, whose handle 12 is in the middle position, as shown in the drawing.

During the time required for the clutch coupling, the electro-magnets 8 and 9 are not excited, and at this time the coupling device will fulfil its function, which is to start the driven shaft 2 progressively and without shocks, owing to its internal slipping.

When the speed of the shaft 2 has become sufficient, the handle 12 is placed upon the contact-piece 13; the electro-magnet 8 is thus excited and it attracts the armature 11 to which it is now secured, thus preventing all slipping between the driving shaft 1 and the driven shaft 2.

If at slow speed or upon stopping the driving shaft 2, it is desired to change the speed or to reverse the motion, the handle 12 is placed upon the contact-piece 14; the circuit of the electro-magnet 8 is broken and the electro-magnet 9 is now excited and it thus attracts the armature 11 and impedes or if necessary stops its rotation, hence reducing or annulling the residual driving torque due to the hydraulic coupling. The shaft 2 is stopped, thus providing for an easy handling of the parts ensuring the change of speed or the reversal of motion.

The automatic operation is as follows. By means of the contact-piece 19 which is connected with the source of current 21 by operating the switch 20, the current is sent into the automatic switch whose arm 15 is located on the contact-piece 17, in the idle position. The electro-magnet 9 is now excited, and it holds the armature 11 in the braked position.

When the driving shaft 1 reaches a given speed which is rather slow, the hydraulic driving torque thus acting upon the shaft 2 will exceed the braking torque of the electro-magnet 9, so that the shaft 2 is now actuated, and the lateral component due to the centrifugal force thus produced upon the masses 25 will exceed the tension of the spring 24, thus moving the disc 23 in the contrary direction to the arrow $f^1$. The arm 15 at once leaves the contact-piece 17, and the electro-magnet 9 is no longer excited.

During the time necessary for the clutch coupling, the said coupling device acts as above stated for the case of the manual control, and the switch arm comes nearer the contact-piece 16, then coming upon the latter at a given speed. The electro-magnet 8 is now excited, thus attracting the armature 11, and the transmission takes place, without slipping, from the driving shaft 1 to the driven shaft 2.

By the action of the spring 24, the disc 23 tends to move in the direction of the arrow $f^1$ and the arm will return to the contact-piece 17 when the rotation of the driven shaft 2 greatly decreases or stops; the electro-magnet 9, when thus excited, will brake the armature 11, thus reducing or annulling the residual driving torque, and hence providing for a change of speed or a reversal of motion.

In some cases, it may be preferable to use the automatic control only to excite the electro-magnet 8. By an arrangement of circuits, the manual control can be employed to excite the electro-magnet 9 at the proper time.

Instead of using the differential device adapted for reverse motion and for change of speed, as above described, the shaft 2 may be connected with the shaft 31 by a reversing gear, for instance of the type represented in Fig. 2. The said gear comprises a bevel gear wheel 35, keyed to the shaft 2 and engaging two bevel gear wheels 36 and 37 which are loose upon the driven shaft 31, with which they can be connected separately by means of a claw sleeve 38 which is slidable on a key on the shaft 31.

In order to obtain an increase of the capacity of transmission, a more gradual coupling action, and a better condition of the surfaces, it may be of advantage to give a particular form and hardness to the magnetic friction surfaces.

Figs. 3, 4 and 5 show the armature 11, whose contact faces 11a and 11b are tapered towards the interior, i. e., the radial section of the armature is trapezoidal to a very slight degree, the large base being located upon the cylindrical part of large diameter.

This arrangement has the advantage of displacing to the exterior the centre of the pressures due to the magnetic attraction, thus increasing the mean radius of the driving and hence of obtaining a greater driving capacity.

By the effect of the magnetic attraction, the armature 11 will at first be applied, by its large diameter, upon the corresponding electro-magnet 8 or 9 with which it makes friction contact (Fig. 4). As the operation takes place in oil, the lubricant which is contained in the annular space of triangular section thus afforded, will escape towards the part of large diameter, and will lubricate the portions of the surfaces which have already come into action. This lubrication will last until the deformation produced by the magnetic attraction, when this latter arrives at its maximum degree, permits the whole of the surfaces to make contact and to effect the driving action without any slipping between these surfaces. (Fig. 5.)

By hardening the friction surfaces either by a treatment or by the addition of another metal which is harder and adheres perfectly, the friction surfaces can be given an almost unlimited duration.

Obviously, the invention is not limited to the embodiments herein described and represented, which are given solely by way of example.

Having now described my invention what I claim as new and desire to secure by Letters Patent is:

1. In combination a driving shaft, a driven shaft, a coupling device between said driving shaft and said driven shaft adapted to allow slipping of one of said shafts with respect to the other shaft, a stationary member, cooperating electromagnetic braking means carried by said driven shaft and said stationary member adapted to maintain said driven shaft in a fixed position, and electromagnetic clutching means between said driving shaft and said driven shaft adapted to lock said driving shaft and said driven shaft together, and means adapted to energize selectively said electromagnetic means.

2. In combination a driving shaft, a driven shaft, a coupling device between said driving shaft and said driven shaft adapted to allow slipping of one of said shafts with respect to the other shaft, an armature rigidly connected with said driven shaft, on one side of said armature a stationary electromagnet adapted to attract said armature and to maintain the same stationary, on the other side of said armature a movable electromagnet rigidly connected with said driving shaft and adapted to attract said armature and to rotate the same at the speed of said driving shaft, and means adapted to energize selectively said electromagnet.

3. In a combination according to claim 2, the further feature consisting in that the opposite faces of said armature cooperating with said electromagnets are slightly diverging towards the outer periphery of said armature.

4. In combination a driving shaft, a driven shaft, an armature rigidly connected with said driven shaft and provided on its opposite sides with faces slightly diverging towards the outer periphery of said armature, a stationary electromagnet adapted to cooperate with one of said faces of said armature and to maintain said armature stationary, a movable electromagnet rigidly connected with said driving shaft and adapted to cooperate with the other face of said armature and to rotate said armature at the speed of said driving shaft, and means adapted to energize selectively said electromagnets.

5. In a combination according to claim 4, the further feature consisting in that said faces of said armatures are hardened metal surfaces.

6. A combination according to claim 1, further comprising a source of electric current, a two-way switch having three terminals, one of which being adapted to be connected with said source of current, two connecting means connected on one hand respectively with said electromagnetic braking means and with said electromagnetic clutching means and on the other hand respectively with the two other terminals of said switch, and means responsive to the speed of said driven shaft and adapted to control said switch and to connect said source of current with said braking means at low speeds of said driven shaft and to connect said source of current with said clutching means at high speeds of said driven shaft.

7. A combination according to claim 1 further comprising a source of electric current, a first hand operated two-way switch having three terminals, one of which being connected with said source of current, a second hand operated two-way switch and a third automatic two-way switch each having three terminals, a first terminal of each of said second and third switches being connected respectively with the two other terminals of said first switch, connecting means on one hand between said electromagnetic braking means and a second terminal of each of said second and third switches and on the other hand between said electromagnetic clutching means and the third terminal of each of said second and third switches, and means responsive to the speed of said driven shaft and adapted to control said third switch and to connect said source of current with said braking means at low speed of said driven shaft and to connect said source of current with said clutching means at high speeds of said driven shaft.

8. In combination, a driving shaft, a driven shaft, a coupling device between said driving shaft and said driven shaft adapted to allow slipping of one of said shafts with respect to the other shaft, a stationary member, cooperating electromagnetic braking means carried by said driven shaft and said stationary member adapted to maintain said driven shaft in a fixed position, a source of electric current, connecting means between said source of current and said electromagnetic braking means, a switch inserted in said connecting means, and means responsive to the speed of said driven shaft and adapted to control said switch and to close said switch when the speed of said driven shaft is below a determined value and to open said switch when the speed of said driven shaft exceeds said determined value.

9. In combination, a driving shaft, a driven shaft, a coupling device between said driving shaft and said driven shaft adapted to allow slipping of one of said shafts with respect to the other shaft, a stationary member, cooperating electromagnetic braking means carried by said driven shaft and said stationary member adapted to maintain said driven shaft in a fixed position, a source of electric current, a two-way switch having three terminals, one of which being connected with said source of current, two connecting means connected on one hand with said electromagnetic braking means and on the other hand respectively with each of the two other terminals of said two-way switch, in one of said connecting means a hand operated switch, in the other connecting means an automatic switch, and means responsive to the speed of said driven shaft and adapted to control said automatic switch and to close said switch when the speed of said driven shaft is below a determined value and to open said switch when the speed of said driven shaft exceeds said determined value.

JEAN COTAL.